Figure 1:
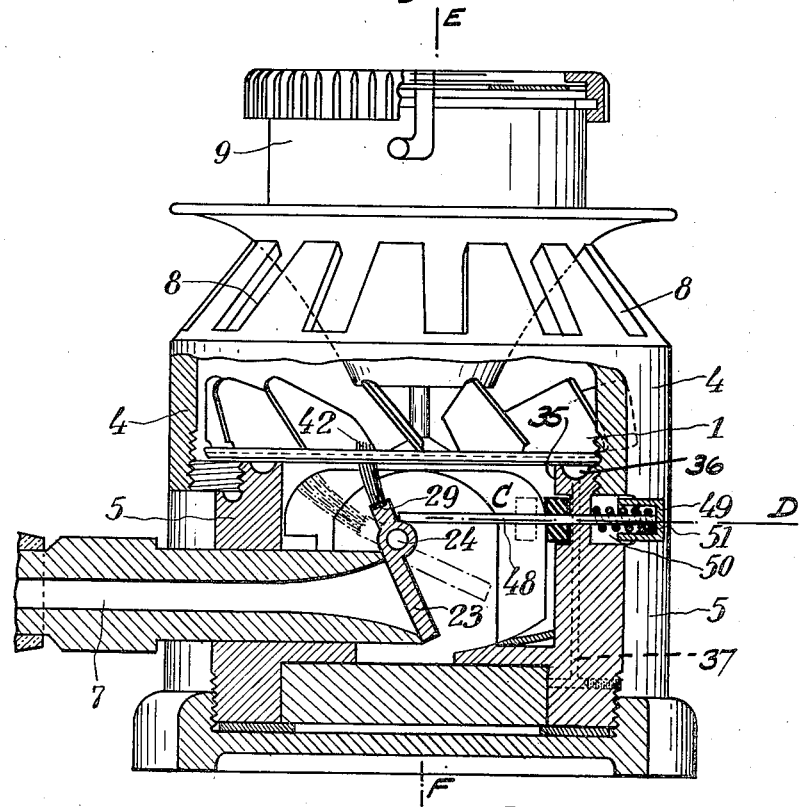

Nov. 9, 1937.   H. DORNSEIF   2,098,280
SPIROMETER
Filed May 20, 1936   2 Sheets-Sheet 1

Inventor:
Hugo Dornseif
by S. Loral
Attorney.

Nov. 9, 1937.  H. DORNSEIF  2,098,280
SPIROMETER
Filed May 20, 1936   2 Sheets-Sheet 2

Inventor:
Hugo Dornseif
by S. Sokal.
Attorney.

Patented Nov. 9, 1937

2,098,280

UNITED STATES PATENT OFFICE 2,098,280

SPIROMETER

Hugo Dornseif, Radevormwald, Germany

Application May 20, 1936, Serial No. 80,793
In Germany March 9, 1934

15 Claims. (Cl. 128—2.08)

Applications were filed in Germany on March 9, 1934, January 16, 1935, May 16, 1935, June 27, 1935, October 10, 1935, December 18, 1935, and April 2, 1936.

The subject of the invention is a spirometer comprising a bladed wheel, particularly one designed for axial flow of the air, and a counting mechanism operatively connected with the bladed wheel.

The object of the invention is to produce a spirometer which is particularly suitable from the hygienic point of view, but is simultaneously of very simple construction and insures great accuracy of measurement.

In accordance with the invention, this object is attained by supplying the air to the bladed wheel by means of a helical conduit which is arranged coaxially with the bladed wheel and opens immediately on to the said wheel so that the air current impinges on the blades of the wheel in the helical direction of flow imparted to it by the said conduit. Owing to this arrangement, the air is given, before entering the bladed wheel, a rotary movement, by which, moisture contained in the air which chiefly carries the germs of illness, is with considerable force thrown out and deposited upon the walls of the helical admission conduit, so that the germs of the illness of the patient are caught in the apparatus and do not pass outside. At the same time, any irregularities or losses in the flow of the air are avoided by the helical formation of the admission conduit. The rotating air flow may open into a chamber which is open towards the bladed wheel, for instance, by constructing the admission conduit as a pit open towards the bladed wheel and provided with a helically rising bottom. In this construction, the admission conduit has a vertical wall or side upon which deposited moisture containing the germs can easily flow downwards. The moisture flowing down the side of the pit may be collected in a collecting vessel or container arranged upon the bottom of the pit, for instance, by providing upon the base of the pit a layer of fibrous material or like substance adapted to absorb and hold the moisture. It is advisable to provide in the collecting vessel and in the fibrous material upon the base of the vessel, a disinfectant which disinfects the moisture and also disinfects by evaporation the whole apparatus, so that any germs are destroyed or rendered innocuous. This automatic disinfection of the apparatus and the air breathed through the apparatus is very important.

In order to avoid any possibility of moisture deposited upon the wall of the pit reaching the bladed wheel and thereby affecting the accuracy of measurement, a groove may be provided behind the upper edge of the wall of the pit, in which, rising moisture is collected and evaporated, or from which the moisture is returned through a suitable conduit to the base of the container.

The provision of a pit-shaped admission conduit has also the advantage of obtaining very complete admission of the air to the bladed wheel. This construction is, moreover, very simple and facilitates cleaning.

It is advantageous to provide in the passage through which the air is blown in, a return valve which opens only when the blow-in pressure reaches a certain predetermined degree. This return valve also prevents sucking back of the air. When the blow-in pressure drops below the prescribed minimum pressure, the valve closes. It is therefore impossible for the patient to breathe air in through the apparatus as, when any attempt to breathe in is made, the valve automatically closes. This arrangement also avoids any possibility of the operator breathing in any disinfectant or germs contained in the apparatus. The arrangement also enables the operator to observe continuously the blow-in pressure and to maintain the blow-in pressure, during the test, at a constant degree suitable to the force exerted by the lungs. A portion of the moisture contained in the air is deposited upon the valve, and this portion too is therefore prevented from reaching the bladed wheel and can easily be collected and returned to the collecting vessel or substance.

The valve may consist of an upwardly opening flap, which is connected with an outward visible pressure indicator, and is, for instance, arranged in front of the blow-in passage which opens tangentially into the admission conduit.

The diameter of the nozzle and the formation of the nozzle through which the air is blown in, and the flap valve, may be so chosen that, when the flap valve is properly opened, the air is discharged at a predetermined pressure which is so chosen that it corresponds with the most favourable breathing out pressure. This avoids, on the one hand, a detrimental over-pressure in the lungs, and, on the other hand, has the effect that the time of blowing air into the apparatus is not too long, and therefore does not cause any distress to the patient owing to lack of breath. This construction therefore avoids any overstress and any over-pressure, which, in certain circumstances, might injure the patient or person undergoing the test.

As the person undergoing the test can, on breathing out, observe the amount or quantity breathed out upon the counting mechanism and can also observe the pressure of the breathed out air upon the pressure meter, the apparatus can be used, not only as a meter, but also for exercises.

The valve may advantageously be connected with a brake for the bladed wheel, preferably a resilient brake, which releases the wheel only at a certain predetermined minimum pressure and when the valve is properly open, and immediately brakes the bladed wheel upon the blow-in pressure dropping under the prescribed minimum pressure, more particularly at the end of the blowing-in and that is at the end of the measuring operation. Preferably, the flap valve itself carries an easily bendable brake spring consisting, for instance, of a bundle of bristles, which engages directly the blades of the wheel. This arrangement has the advantage that the valve is, upon the brake coming into action, pressed by the vis viva of the wheel firmly against the mouth of the nozzle, whereby an airtight closure is attained which effectually and safely prevents any breathing in through the apparatus.

In order to obtain an easy opening of the valve and an easy support of the bladed wheel, notwithstanding a strong braking action and reaction of the brake upon the valve, a hand-operated release device for the bladed wheel may be provided.

The air, which leaves the bladed wheel in an axial direction, may be deflected by a suitable conical guide wall in a radial direction to suitable discharge slots. A further guide wall is preferably provided outside the casing and above the discharge slots, for the purpose of completely deflecting the issuing air in a radial direction and preventing this air from coming into contact with the surface of the casing. This arrangement has the advantage that the operator does not, in manipulating the apparatus, come into contact with any surfaces or parts which were in contact with the air breathed through the apparatus. The counting mechanism may suitably be arranged coaxially with the bladed wheel, within a space enclosed by the conical guide wall. This avoids any possibility of moisture or germs entering the counting mechanism. The construction also provides for a proper guidance of the air in a direction corresponding with the flow of the air produced by the centrifugal force, and is extremely simple and compact.

Figure 2:
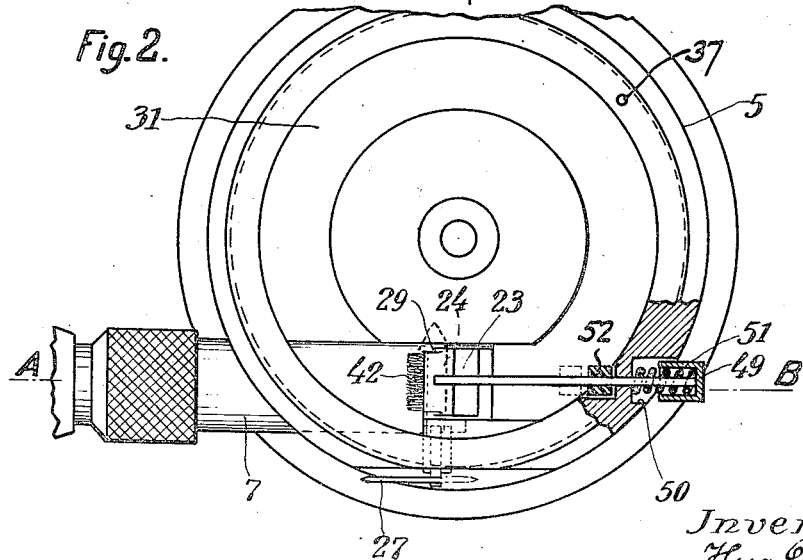
Figure 3:
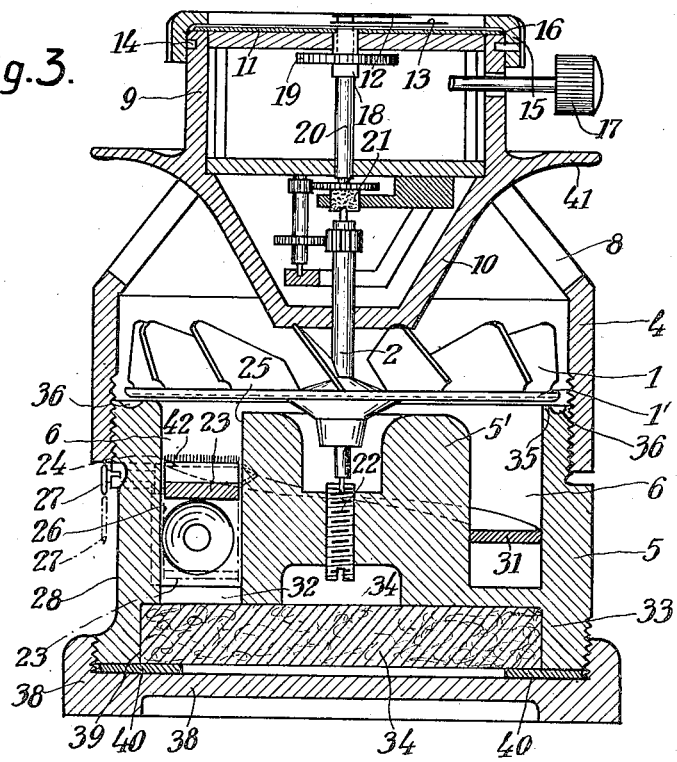

One construction embodying the features of the invention is shown by way of example in the accompanying drawings, in which:

Fig. 1 shows to an enlarged scale the improved spirometer, partly in elevation and partly in section, on line A—B of Fig. 2, Fig. 2 is a top view of the lower part of the casing, and partly a section on line C—D of Fig. 1, Fig. 3 is a vertical section on line E—F of Fig. 1.

In the illustrated constructional example, 1, 1' indicates an axial flow bladed wheel the blades 1 of which are connected at their lower outer parts by the annular member 1'. The said wheel is driven by a current of air admitted from below, and is mounted upon a shaft 2, which latter is operatively connected with a counting mechanism which measures the number of revolutions performed by the bladed wheel and thereby directly indicates the amount or quantity of air blown through the bladed wheel by one breath of the person whose lungs are being tested by the apparatus.

The bladed wheel 1 runs in a cylindrical bipartite casing 4, 5. The lower part 5 of the casing contains a helical blow-in channel 6 which is constructed as a channel open to the bladed wheel 1 and provided with a helically ascending bottom 31, and communicates with a tangentially arranged member 7 to which a tube (not shown) is connected. The part 4 of the casing, in which the bladed wheel 1 rotates, is reduced in diameter above the bladed wheel, the reduced portion being of conical shape. In the conically reduced portion of the casing are provided slots 8 for the escape of air that has passed through the bladed wheel. With the reduced conical portion is connected a cylindrical portion 9 of the casing. In this cylindrical portion is mounted a clockwork, so that, in addition to the number of revolutions performed by the wheel, the time of the test can be measured. The revolution counter is arranged below the clock, and is enclosed by a dish-shaped downwardly tapering conical portion 10 of the casing. The diameter of the base of this portion, which extends down to the bladed wheel 1, is about double the size of the blade. The casing of the counter therefore occupies the middle space of the main casing which is not required for the discharge of the air passing through the bladed wheel, and, moreover, forms, particularly at its exterior, a guide surface for the air escaping through the discharge slots 8.

At the top end of the casing 9 there is provided a dial 11, having a double scale for the time and for the number of revolutions, upon which play the pointers 12 and 13 of the clock and the revolution counter respectively. After a measurement has been carried out the pointer 12 of the revolution counter can be brought by hand into register with the time pointer 13 again and then the dial plate 11 can be turned back again by means of a manipulating ring 15 held by a projection in an annular groove 14 of the clock casing 9 until the pointer again registers with the zero mark of the double scale. The manipulating ring 15 is provided with carrying projections 16 which engage corresponding recesses of the dial plate 11.

The clockwork is indicated diagrammatically in the drawings by a knob 17 projecting laterally from the casing which serves for winding up and stopping the clock, and by the pointer shaft 18 with pointer 13 and a driving gear 19. The pointer shaft 20 of the revolution counter passes through the clock and the hollow pointer shaft 18 of the clock.

The shaft of the bladed wheel 1 is mounted with its upper end in a bearing 21 of the revolution counter and with its lower end in a bearing 22 of the casing part 5 containing the blow-in channel 6. The lower bearing 22 is vertically adjustable for the purpose of compensating any inaccuracy in manufacture. In the constructions shown, the bearing 22 is formed in the top of a setscrew screwed into the centre of an inner portion 5' of the casing part 5.

In front of the inner end of the blow-in nozzle or connection socket 7, is arranged a flap valve 23 which is turnably mounted about a horizontal shaft 24 located above the inner opening of the socket or nozzle 7. The flap valve 23 is swung downwards by its own weight and lies tightly fitting in front and upon the opening of the nozzle or socket. The flap valve 23 opens under the pressure of the blown-in air, but only when said air pressure exceeds a certain degree. The socket is constructed as a nozzle in order to obtain a sufficient pressure upon the flap valve 23. The diameter of the nozzle and its shape, as well as those of the flap valve, are so chosen that, with the flap valve 23 properly opened, the air will issue at a predetermined pressure which is most favourable for obtaining correct measurement. This pressure must be in accordance with the most favourable breathing out pressure, so that, on the one hand, detrimental over-pressure in the lungs is avoided, and, on the other hand, the blowing of the air into the the apparatus will occur within a suitable length of time, without causing the person undergoing the test any difficulty in breathing. This most favourable breathing out pressure corresponds to about 0.07 atmospheres over-pressure. By these considerations, the construction of the valve and its dimensions, as well as the weight of the flap valve, are determined.

In the vicinity of the flap valve 23, opposite walls of the blow-in channel or blow-in pit are made plane or flattened. In the plane or flattened wall parts 25, 26 is mounted a shaft 24 on which the flap valve 23 rotates. One end 24' of the shaft is extended outwardly through the wall of the casing part 5, and carries outwardly a pointer 27 which indicates the position of the flap valve 23 and the corresponding pressure at the time being. The pointer plays upon a scale calibrated in units of pressure, say atmospheres, and mounted upon the outer surface of the casing. The scale is located in a recess 28 of the wall of the casing. The most favourable position of the flap valve 23 is indicated upon this scale by a stop, say red. Marked in this manner, the pressure can be readily ascertained and maintained at its most favourable value during the whole time of blowing in the air.

The flap valve is provided with a nose 29 which, in the closed position of the valve, is upwardly directed. This nose 29 is provided with a bundle 42 of bristles which, upon the closing of the valve 23, engages between the blades of the bladed wheel and thereby brakes the bladed wheel. On the valve 23 opening, the nose 29 with the bundle of bristles swings downwards and releases the bladed wheel so that the latter can be rotated by the blown-in air. When the normal or proper pressure ceases, the valve closes and the bladed wheel, as well as the counter, are again braked. Overrunning which might affect detrimentally the result of the measuring operation, is thereby avoided. Only that quantity of air is measured which has been blown in at the required pressure. By the action of the bladed wheel upon the bristles 42, the flap valve 23 is firmly pressed against the opening of the nozzle and consequently an airtight closure is attained.

Lest, at the commencement of the measuring operation, the opening of the flap valve 23 and the start of the bladed wheel 1 be unduly retarded by the brake 42, which might cause the person undergoing the test, for instance a patient suffering from lung trouble, to exert too much pressure in order to overcome the action of the brake, a hand-operable release member or pin 48 is provided. This release pin is mounted, horizontally slidable, opposite the blow-in nozzle 7, in the wall of the casing portion 5 containing the blow-in channel. The pin 48 is provided upon its externally projecting end with a cap-shaped operating knob 49. This operating knob fits the opening of a bore 50 of a suitable depth, and can, therefore, be projected inwardly only by a limited amount, namely, until the knob 49 comes into contact with the end wall of the bore 50. The inner free end of the pin presses upon the brake lever or the nose 29 of the flap valve 23, and turns the flap valve and consequently also the bundle of bristles to such an extent that the bristles come out of engagement with the blades of the bladed wheel. The pressure upon the brake is then released, and the bladed wheel can, even with a small initial blow-in pressure, start with full force. It is also not necessary to exert at the start of the test, an excessively strong air pressure which might injure the person undergoing the test, or affect accuracy of measurement. As soon as, after the release of the brake by the forward push of the pin 48, the knob 49 is again released, the pin will return by the action of its return spring 51 to its initial position. This return spring is mounted upon the outer end of the pin 48. The spring bears with one end against the base of the bore 50 and with its other end upon the top of the cap-shaped knob 49. For limiting the return movement effected by the return spring 51, the pin 48 is provided with a stop collar 52 which co-operates with the inner surface of the casing portion 5. This collar 52 may be made of rubber in order to provide for a satisfactory closure of the bore in which the pin 48 is guided, and thereby prevents air escaping outwardly along the pin.

By the helical guiding of the air blown in, moisture contained in the air is thrown out by centrifugal force outwardly against the side of the pit, is deposited or condensed thereon and then flows through an opening 32 provided at the lowest point of the pit or channel 6, into a chamber 33 provided in the lowest portion of the casing 5. The opening 32 lies directly under the opening of the nozzle and under the flap valve, which is particularly advantageous, as, at this point, most of the moisture will be deposited. In the collecting container 33 is provided a disc 34 of fibrous material which absorbs and retains the moisture. This layer of fibrous material may be saturated with a disinfecting medium, with a view to rendering innocuous any harmful germs. In order to prevent any moisture which might be carried by the air current upwardly upon the wall of the chamber or pit containing the guide channel, from reaching the bladed wheel, a groove 36 is provided in rear of the upper edge 35 of the pit wall. Any moisture that might have risen to the top will collect in this groove and is returned through a duct 37 to the lower container. The collecting container is closed at the bottom by a closure 38 which forms also the base of the apparatus. Between the cover or base 38 and the lower edge 39 of the collecting chamber there is provided a rubber packing ring 40.

The blades of the bladed wheel project upwardly above the outer edge 35 of the pit or chamber containing the guide channel, so that any air rising at the outer edge will fully impact upon the blade surface and be fully utilized in propelling the bladed wheel.

Above the discharge openings or slots 8 there is provided a guide wall 41, which deflects the escaping air completely in a radial direction, and thereby effectively separates this air from the adjustment edge 15 of the dial plate. This arrangement has the advantage that germs, moisture or other injurious substances cannot be deposited upon the adjustment edge. The guide wall 41 lies in the extension of the guide surface formed by the outer surface of the casing 10 of the counting mechanism.

It will be understood that the invention is not limited to the construction shown, various variations and modifications being possible within the scope of the appended claims.

I claim:

1. In a spirometer the sub-combination of a housing; a bladed wheel in said housing; a counting mechanism operatively connected with said bladed wheel; a helical guide conduit for supplying air to said bladed wheel; and a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to its by the guide conduit.

2. In a spirometer the sub-combination of a housing; a bladed wheel in said housing constructed for axial flow of the driving air; a counting mechanism operatively connected with said bladed wheel; a helical guide conduit for supplying air to said bladed wheel; and a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit.

3. In a spirometer the sub-combination of a housing; a bladed wheel in said housing; a counting mechanism operatively connected with said bladed wheel, a helical guide conduit for supplying air to said bladed wheel and comprising a cylindrical chamber arranged under said bladed wheel and open to the latter at the top so that the said bladed wheel is fully acted upon by the air, and provided with a helically shaped ascending bottom; and a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit.

4. In a spirometer the sub-combination of a housing; a bladed wheel in said housing; a counting mechanism operatively connected with said bladed wheel; a helical guide conduit for supplying air to said bladed wheel; and a collecting chamber for the moisture deposited in said conduit by centrifugal force, connected to said guide conduit at its lowest part and having a removable bottom and a duct leading from the lowest point of the helical guide conduit to the collecting chamber, said guide conduit being arranged coaxially with the bladed wheel and opening immediately on to the bladed wheel, whereby the air acts upon the bladed wheel in the helical direction of flow imparted to it by the guide conduit.

5. In a spirometer the sub-combination of a housing; a bladed wheel in said housing; a counting mechanism operatively connected with said bladed wheel; a helical guide conduit for supplying air to said bladed wheel; and a collecting chamber for the moisture deposited in said conduit by centrifugal force, connected to said guide conduit at its lowest part and having a removable bottom, a duct leading from the lowest point of the helical guide conduit to the collecting chamber and a layer of absorbent material arranged in the chamber and saturated with a disinfectant, said guide conduit being arranged coaxially with the bladed wheel and opening immediately on to the bladed wheel, whereby the air acts upon the bladed wheel in the helical direction of flow imparted to it by the guide conduit.

6. In a spirometer the sub-combination of a housing, a bladed wheel in said housing; a vertical shaft upon which said bladed wheel is mounted; a counting mechanism operatively connected with said bladed wheel; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit; and said conduit being also provided in its top edge with a groove for collecting moisture and a duct for leading away moisture collecting in said groove towards the base of said chamber.

7. In a spirometer the sub-combination of a housing, a bladed wheel in said housing; a counting mechanism operatively connected with said bladed wheel; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit; and a non-return valve interposed within said guide-conduit, said non-return valve being so loaded as to open only at a predetermined initial blow-in pressure and being arranged in front of said guide conduit and in front of said collecting chamber, whereby the drawing back of disinfecting vapours and the air charged with diseased germs from the apparatus is prevented.

8. In a spirometer the sub-combination of a housing; a bladed wheel in said housing; a counting mechanism operatively connected with said bladed wheel; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit; and a non-return valve in said guide conduit, said non-return valve comprising a flap valve tending to close under its own weight and adapted to swing upwards when open, and an outwardly visible pressure indicator operatively connected with said flap valve.

9. In a spirometer the sub-combination as specified in claim 1 in further combination with: a blow-in nozzle co-operating with said conduit; a flap valve controlling said nozzle, said flap valve being provided with a resilient member engaging the blades of said wheel and thereby braking said wheel, said flap valve being so mounted that when the valve closes and the resilient member engages the blades of the wheel, the wheel has the tendency to bring and to hold the valve with resilient pressure in the closed position.

10. In a spirometer the sub-combination of a housing; a bladed wheel in said housing; a counting mechanism operatively connected with said bladed wheel; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit; a nozzle for blowing air in said conduit; and a flap valve controlling said nozzle and provided with a bundle of bristles adapted to engage in the closing position of the valve the blades of said bladed wheel.

11. In a spirometer the sub-combination of a housing; a bladed wheel in said housing; a counting mechanism operatively connected with said bladed wheel; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit, a nozzle for blowing air into said conduit; a flap valve controlling said nozzle; a brake for said bladed wheel operatively connected with said flap valve; and manually operable means for releasing said brake.

12. In a spirometer the sub-combination as specified in claim 1 in further combination with: a blow-in nozzle co-operating with said conduit; a flap valve controlling said nozzle; a brake for said bladed wheel operatively connected with said flap valve; manually operable means for releasing said brake, said manually operable releasing means comprising a push pin operable by hand from the outside of said housing and provided with a return spring tending to move the pin into its initial inoperative position; and stop members arranged on the outer and inner parts of said pin respectively and co-operating with the wall of said housing to limit the movement of said pin in either direction.

13. In a spirometer the sub-combination of: a casing provided with discharge slots for the air; a bladed wheel in said casing below said slots; a counting mechanism operatively connected with said bladed wheel including a dial for reading off the measurements arranged above the wheel coaxially therewith; a helical guide conduit for supplying air to said bladed wheel; a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit; and a conically upwardly flaring guide member for guiding air issuing from said bladed wheel radially and upwardly to said discharge slots whereby the air is dispersed in a spray away from the axis of the spirometer in all directions horizontally into the open air and does not pass upwards and outwards over said dial where the head of the person taking the measurement is located, said guide member constituting at the same time a casing closely enclosing said counting mechanism.

14. In a spirometer the sub-combination of: a main casing containing near the top discharge openings for the air; a bladed wheel rotatably mounted in said casing about a vertical axis below said discharge openings; a chamber above said bladed wheel; a counting mechanism within said chamber arranged coaxially with and operatively connected with said bladed wheel; said chamber having a conically upwardly flaring wall for guiding air issuing from said bladed wheel to said discharge openings and also having an outer portion exterior of said casing for guiding said air outside the discharge openings in a radial and horizontal direction; a helical guide conduit for supplying air to said bladed wheel; and a collecting chamber for the moisture deposited in said conduit by centrifugal force, connected to said guide conduit at its lowest part, said guide conduit being arranged coaxially with the bladed wheel and opening immediately on to the bladed wheel, whereby the air acts upon the bladed wheel in the helical direction of flow imparted to it by the guide conduit.

15. In a spirometer the sub-combination of: a casing; a cylindrical chamber in said casing which is open at the top and is provided with a helical guide channel for the air; a bladed wheel adapted to rotate about a vertical axis and located immediately above the opening of said cylindrical chamber; the blades of said wheel projecting radially outwardly beyond the top edge of said chamber so that no air can escape between the wall of said chamber and said bladed wheel, but that the whole of the air flowing out of said chamber strikes on the blades of said bladed wheel; and a collecting chamber for the moisture deposited in said guide channel by centrifugal force, said collecting chamber being arranged within said first-named chamber.

HUGO DORNSEIF.